United States Patent [19]

Oishi

[11] Patent Number: 4,761,701

[45] Date of Patent: Aug. 2, 1988

[54] BIASING MEMBER FOR BIASING A TAPE IN A MAGNETIC TAPE CASSETTE

[75] Inventor: Kengo Oishi, Kanagawa, Japan

[73] Assignee: Fuji Photo Film Co., Ltd., Kanagawa, Japan

[21] Appl. No.: 74,816

[22] Filed: Jul. 17, 1987

[30] Foreign Application Priority Data

Jul. 17, 1986 [JP] Japan ............................ 61-108694[U]

[51] Int. Cl.⁴ .............................................. G11B 23/04
[52] U.S. Cl. ................................ 360/130.33; 360/132
[58] Field of Search ........................... 360/132, 130.33; 242/198

[56] References Cited

U.S. PATENT DOCUMENTS 4,314,299  2/1982  Ishida et al. ................... 360/130.33
4,544,975  10/1985  Oishi et al. .................... 360/130.33

Primary Examiner—Robert S. Tupper
Attorney, Agent, or Firm—Sughrue, Mion, Zinn, Macpeak & Seas

[57] ABSTRACT

A plate spring with an attached pad for mechanically biasing a magnetic tape in a tape cassette. The plate spring has a central portion to which the pad is attached, two tapering portions on either side thereof, and two pawls at right angles at the ends of the tapering portions for fixing the spring plate to the cassette. The tapering portions have a apertures structure with all holes in the apertures being smaller than the pawls.

5 Claims, 1 Drawing Sheet

BIASING MEMBER FOR BIASING A TAPE IN A MAGNETIC TAPE CASSETTE

BACKGROUND OF THE INVENTION

Field of the Invention

The present invention relates to magnetic tape cassettes such as compact cassettes.

Background of the Invention

In a magnetic tape cassette such as a compact cassette (hereinafter simply referred to as "cassette"), a tape pad is disposed inside the magnetic tape at a position where a magnetic tape is to be made to come into contact with a magnetic head of a recording/reproducing apparatus. This tape pad is biased toward the magnetic tape. If the magnetic head is inserted into the cassette so as to carry out recording/reproducing, the magnetic tape is pressed by an action of the above-mentioned tape pad to come into elastic contact with the magnetic head. In a tape recorder of the open reel type, or the like, a tape path is set up so that a magnetic tape is pressed against a magnetic head to thereby obtain close contact of the magnetic tape with the magnetic head. In a cassette such as a compact cassette in which a magnetic tape is not drawn out of the cassette, it is impossible to set up such a tape path. Therefore, there is provided such a tape pad as described above so as to press the magnetic tape against the magnetic head.

Such a tape pad is generally formed of felt. The tape pad is fixed to a central portion of a plate spring arranged substantially in parallel to the magnetic tape at the inside of the magnetic tape so that the tape pad is urged against the back of the magnetic tape by the plate spring. The conventional cassette using such a tape pad of the kind as described above had a disadvantage that a magnetic head of a recording/reproducing apparatus was apt to be subjected to abrasion on one side.

In more detail, in a conventional cassette, the above-mentioned plate spring was formed in such a manner that, for example, a plate spring was punched out from an elastic plate material, such as a phosphor bronze plate. The plate spring had a cross shape in which elongated belt-like portions were extended rightward and leftward respectively from a center of a rectangular pad support portion. The plate spring was disposed in a cassette case half so that the belt-like portions were made to be substantially horizontal with respect to a magnetic tape. However, there sometimes occurred such a defect that the central pad support portion was formed unevenly in the punching work so that the upper and lower elongated belt-like portions were respectively bent in the direction slightly differently from each other. As a matter of course, the pressure applied to a magnetic head by a tape pad fixed to such a plate spring becomes uneven over the magnetic head in its widthwise direction. Such irregularity in pad pressure is not always caused by the shape of the plate spring but may be caused by a dimensional error of the cassette case half in which a plate spring is supported, by an improper insertion attitude of a magnetic head of a recording/reproducing apparatus, and so on.

As is well known, in the great fraction of the recording/reproducing apparatus of the type using a cassette, a magnetic tape is subject to bidirectional recording/reproducing without the cassette being turned over. Therefore, a magnetic core of a magnetic head is arranged to always one side up or down relative to the magnetic tape. A part of the magnetic head other than the magnetic core portion is apt to wear out more than the magnetic core part. Accordingly, if such an irregular pad pressure, particularly, a large pad pressure, is applied to the part of the magnetic head other than the magnetic core part, the part of the magnetic head other than the magnetic core part is more quickly worn out.

In view of such circumstances, there has been proposed a plate spring having a pair of upper and lower arms extending leftward and rightward respectively from the upper and lower portions of a pad support portion. This plate spring is divided into two halves, that is, upper and lower halves. Therefore, if a large force is applied to one of the upper and lower halves, the one half plate spring portion is bent largely independently of the other half plate spring portion so as to reduce the pad pressure of a tape pad portion supported by the one half plate spring portion to thereby make the pad pressure even. As a result, an extremely large pad pressure is prevented from acting on a part of the magnetic head so that the foregoing one-sided abrasion of the magnetic head can be prevented from occurring.

However, the plate spring is divided generally into the two portions, that is, the upper and lower arm portions so as to form a frame which defines a spaces therebetween. Accordingly, there has been an inconvenience in handling the plate spring after the formation of the plate spring. That is, if a large number of plate springs are stored without being arranged, opposite end portions of a plate spring penetrate into a space defined by upper and lower arm portions of another plate spring. Further, plate spring fixing pawls formed at the opposite ends of the plate spring catch the arms of another plate spring so that a group of plate springs may often lump together. Accordingly, in order to handle the plate springs individually one by one in assembling work, it is necessary to individually separate the plate springs one from another, thereby extremely reducing the work efficiency in assembling cassettes.

SUMMARY OF THE INVENTION

It is therefore an object of the present invention to solve the problems in the prior art.

It is another object of the present invention to provide a magnetic tape cassette arranged such that, when a number of plate springs are stored, those plate springs do not mutually intertwist and those plate springs can be handled one by one individually in assembling cassettes.

To attain the above objects, the magnetic tape cassette according to the present invention includes a magnetic tape stretched over an opening of a cassette. A plate spring is disposed at a portion inside the magnetic tape and arranged substantially in parallel to the magnetic tape. A tape pad is fixed to the plate spring. The plate spring has a pad support to which the tape pad is fixed. Tapering portions extend from the opposite sides of the pad support and tapering toward their respective ends. Fixing pawls are formed at the respective ends of the tapering portions by bending the respective ends. The plate spring has a plurality of apertures or holes each having a maximum inside distance smaller than a width of each of the fixing pawls.

Thus, being formed to be a body having a plurality of apertures or holes, the plate spring can properly urge the tape pad against the magnetic tape without deteriorating its elastic property. Further, since the inside distance of each of the apertures or holes formed in the plate spring is selected to be smaller than the width of each of the fixing pawls provided at the opposite end portions of the plate spring, a fixing pawl of a plate spring is prevented from penetrating into an aperture of another plate spring when a plurality of plate springs are stored. Accordingly, a plurality of plate springs do not mutually intertwist when those plate springs are stored so that those plate springs can be handled individually separately one from another, thereby improving the cassette assembling efficiency.

BRIEF DESCRIPTION OF THE DRAWING

Above and other objects, features and advantages of the present invention will appear more fully from the following description in conjunction with the accompanying drawings, in which.

DETAILED DESCRIPTION OF THE PREFERRED EMBODIMENTS

Referring to the accompanying drawing, an embodiment of the present invention will be described hereunder.

Figure 1:
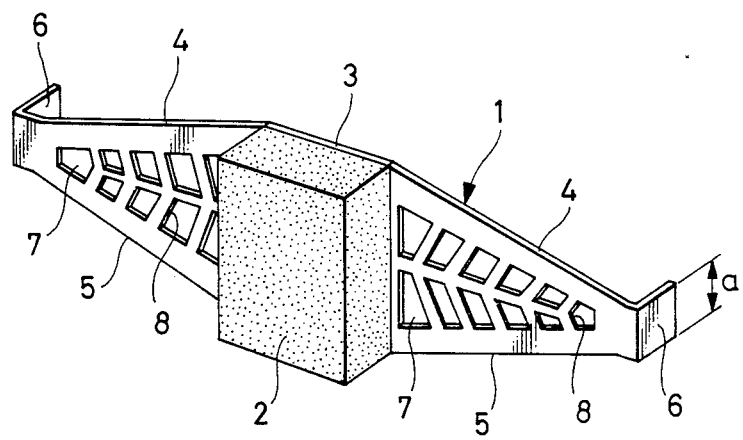
FIG. 1 is a perspective view of the plate spring on which a tape pad is fixed, according to the present invention.

FIG. 1 is a perspective view illustrating a tape pad and a plate spring in an embodiment of the magnetic tape cassette according to the present invention.

In the drawing, a plate spring 1 has such a shape that is tapered from a central portion toward the left and right ends. A tape pad 2 made of an elastic material is fixed at the central portion. The plate spring 1 is constituted by a support portion 3 to which the pad 2 is to be fixed, upper arms 4 extending leftdownward and right-downward from upper opposite sides of the support portion 3, and lower arms 5 extending leftupward and right-upward from lower opposite sides of the support portion 3. The upper and lower arms 4 and 5 at each of the left and right sides of the plate spring 1 are integrated with each other at their ends where a fixing pawl 6 is formed. The pawl 6 is bent in the direction opposite to the tape pad 2. Those left and right fixing pawls 6 are fixedly supported by a cassette case half so that the plate spring 1 is fixed to the cassette case half. Thus, in recording and reproducing, the plate spring 1 can urge the magnetic tape properly against the magnetic head in cooperation with the elasticity of the pad 2.

Grids 8 are provided to form a plurality of apertures or holes 7 in the left and right side portions of the spring plate 1 surrounded by the upper and lower arms 4 and 5, and by the pad support portion 3 so that the plate spring 1 is formed into a generally flat plate having a plurality of apertures or holes. Since the elasticity of the plate spring 1 is generated mainly by the upper and lower arms 4 and 5, it is preferable that width of each of the grids 8 is selected to be smaller than the width of each of the upper and lower arms 4 and 5 so as not to exert a significant influence on the elasticity of the upper and lower arms 4 and 5. The maximum inside dimension of the apertures or holes 7 is selected to be smaller than the width a of each of the fixing pawls 6. The shape of the apertures or holes 7 is not limited to only a round one or a rectangular one. However, preferably, the shape of the apertures or holes is selected to be rectangular so as not to exert an influence on the elasticity of the upper and lower arms 4 and 5. The distribution of the apertures or holes 7 is made symmetrical with respect to a horizontal axis of the tape pad 2 so that the elasticity of the plate spring 1 is made even at the upper and lower sides of the pad 2. The distribution of the apertures or holes 7 is made symmetrical with respect to a vertical axis of the pad 2 so that the elasticity of the plate spring 1 is made even in the left and right sides of the pad 2.

Figure 2:
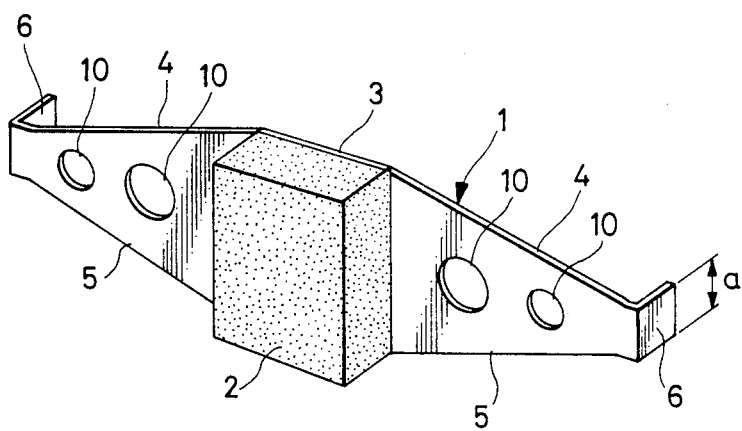
FIG. 2 is a perspective view of the plate spring according to another embodiment of the invention.

FIG. 2 shows another embodiment of the invention. In FIG. 2, like parts and components are designated by the same reference numerals.

A plate spring 1 has two circular apertures 10 at both right and left sides thereof. The distribution of the circular apertures 10 is made symmetrical with respect to a horizontal axis of the tape pad 2 so that the elasticity of the plate spring 1 is made even at the upper and lower sides of the pad 2. Further, the distribution of the circular apertures 10 is made symmetrical with respect to a vertical axis of the pad 2 so that the elasticity of the plate spring 1 is made even in the left and right sides of the pad 2. The diameter of all the appertures is selected to be smaller than the width a of each of the fixing pawls 6.

The number of the circular apertures 10 is not limited to two at each side of the plate spring 1. One or plural apertures may be applicable.

Although no special means for fixing the pad 2 to the support portion 3 is illustrated in the drawing, pawls may be used as the means for embracing the pad 2. The pawls would be formed on the support portion 3. Alternatively, the pad 2 may be attached to the support portion 3 through an adhesive agent. Further, the apertures or holes 7 may be formed also in the support portion 3 so long as the apertures or the holes 7 have no influence on the fixing of the pad 2.

Similarly to the plate spring of the conventional cassette, the plate spring 1 is made of an elastic plate, for example, of phosphor bronze, German silver, stainless steel or the like. Further, similarly to the conventional pad, the pad 2 is made, for example, of felt.

Accordingly to the present invention, a plate spring has a body having a number of apertures or holes each having a maximum inside distance smaller than the width of each of fixing pawls formed at the opposite side end portions of the plate spring. Accordingly, when a plurality of plate springs are stored after fabrication, fixing pawls of any one plate spring are prevented from penetrating apertures or holes of another plate spring and plate springs are prevented from intertwisting mutually. Accordingly, even if a large number of plate springs are stored together, the plate springs can be handled individually one by one so that the cassette assembling property can be remarkably improved. Further, each of the grids defining the apertures or holes of the plate spring is made thinner than the upper and lower arms of the plate spring. Accordingly, the grids do affect the elasticity of the arms, in other words, the elasticity of the plate spring, so that the pad can be properly urged against the magnetic tape, and hence the magnetic tape can be properly urged against the magnetic head, in use of the cassette.

What is claimed is:

1. A biasing member for biasing a tape in a cassette, comprising a pad and a plate spring, said plate spring comprising:

a central portion to which said pad is fixed;

tapering portions extending from opposite sides of said central portions and tapering toward their respective ends; and fixing pawls formed at angles at said respective end; wherein at least each of said tapering portions had formed therein a plurality of apertures having a maximum inside distance less than a width of each of said fixing pawls.

2. A biasing member as recited in claim 1, wherein each of said tapering portions comprises:

two side arms inclined to each other and connecting said central portion and a respective one of said fixing pawls; and a plurality of grids between said two side arms at least partially defining said apertures and being of a width less than widths of said side arms.

3. A biasing member as recited in claim 2, wherein said grids are linear.

4. A tape cassette as recited in claim 3, further comprising:

a cassette case having an opening; and a recording tape stretched over said opening; and wherein said plate spring is disposed within said cassette case behind and in parallel with said tape.

5. A tape cassette as recited in claim 1, further comprising:

a cassette case having an opening; and a recording tape stretched over said opening; and wherein said plate spring is disposed within said cassette case behind and in parallel with said tape.

* * * * *